United States Patent
Kim et al.

(10) Patent No.: US 8,271,043 B2
(45) Date of Patent: Sep. 18, 2012

(54) APPROACH TO A UNIFIED SU-MIMO/MU-MIMO OPERATION

(75) Inventors: Byoung-Hoon Kim, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1063 days.

(21) Appl. No.: 11/841,578

(22) Filed: Aug. 20, 2007

(65) Prior Publication Data

US 2008/0132281 A1 Jun. 5, 2008

Related U.S. Application Data

(60) Provisional application No. 60/839,358, filed on Aug. 21, 2006.

(51) Int. Cl.
*H04M 1/00* (2006.01)
(52) U.S. Cl. ............... 455/562.1; 455/101; 455/561; 375/349
(58) Field of Classification Search ............ 455/101, 455/561, 562.1; 375/349
See application file for complete search history.

(56) References Cited

U.S. PATENT DOCUMENTS

| | | | |
|---|---|---|---|
| 2005/0181811 A1* | 8/2005 | Magnusson et al. | 455/458 |
| 2005/0195912 A1* | 9/2005 | Kim et al. | 375/267 |
| 2006/0018397 A1* | 1/2006 | Sampath et al. | 375/267 |
| 2006/0209764 A1* | 9/2006 | Kim et al. | 370/334 |
| 2007/0147536 A1* | 6/2007 | Melzer et al. | 375/267 |
| 2007/0160162 A1* | 7/2007 | Kim et al. | 375/267 |
| 2007/0243826 A1* | 10/2007 | Liu | 455/67.11 |

OTHER PUBLICATIONS

International Search Report & Written Opinion—US2007/076420—International Search Authority—European Patent Office—May 12, 2010.
Qualcomm Europe: "Description and link simulations of MIMO schemes for OFDMA based E-Utra downlink evaluation" 3GPP Draft; RI-050903, 3rd Generation Partnership Project (3GPP), Mobile Competence Centre ; 650, Route Des Lucioles ; F-06921 Sophia-Antipolis Cedex ; France, vol. RAN WG1, No. London, UK; 20050825, Aug. 25, 2005, XP050100523 p. 6-p. 9.
Taiwan Search Report—TW096130992—TIPO—May 3, 2011.

* cited by examiner

*Primary Examiner* — Lana N Le
*Assistant Examiner* — Hsin-Chun Liao
(74) *Attorney, Agent, or Firm* — Kenyon S. Jenckes

(57) ABSTRACT

An apparatus and method to dynamically schedule user devices in a wireless communication system in single-user multiple-input multiple-output (SU-MIMO) or multiple-user multiple-input multiple-output (MU-MIMO) modes of operation. The dynamic scheduling employs an efficient differential reporting of channel state information that reduces uplink feedback overhead, whereby a base layer value of a channel quality indicator (CQI) is reported in conjunction with a CQI offset value. Antenna subset selection is also reported. The offset value reflects gains by detection with successive interference cancellation if multiple antennas are reported (rank>1), while it reflects the actual offset between single-layer SU-MIMO CQI and MU-MIMO CQI if a single antenna is reported. Scheduled SU-MIMO mode of operation is optimized for a user reporting either a single antenna or multiple antennas, whereas MU-MIMO operation is optimized for a user reporting a single antenna.

31 Claims, 11 Drawing Sheets

APPROACH TO A UNIFIED SU-MIMO/MU-MIMO OPERATION

CROSS-REFERENCE TO RELATED APPLICATION

This application claims the benefit of U.S. provisional application Ser. No. 60/839,358, filed on Aug. 21, 2006, and entitled "A METHOD AND APPARATUS FOR A UNIFIED SU/MU-MIMO OPERATION." The entirety of this application is incorporated herein by reference.

BACKGROUND

I. Field

The following description relates generally to wireless communications, and more particularly to an approach for simultaneously operating and dynamically scheduling single-user/multi-user multiple-input multiple-output modes.

II. Background

In wireless communications, bandwidth and base station transmit power are regulated. Design around these fixed conditions has led to multiple-input multiple-output (MIMO) systems as a path toward realizing increased peak data rate, spectral efficiency, and quality of service. A MIMO system consists of transmitter(s) and receiver(s) equipped, respectively, with multiple ($N_T$) transmit antennas and multiple ($N_R$) receive antennas for data transmission. A MIMO channel formed by the $N_T$ transmit and $N_R$ receive antennas may be decomposed into $N_V$ independent channels, which are also referred to as spatial channels, where $N_V \leq \min\{N_T, N_R\}$ Each of the $N_V$ independent channels corresponds to a dimension. The MIMO system can provide improved performance (e.g. higher throughput, greater capacity, or improved reliability, or any combination thereof) if the additional dimensionalities created by the multiple transmit and receive antennas are utilized. MIMO systems can be divided in two operational classes: (i) Single-user MIMO, and (ii) multi-user MIMO. A main goal of single-user MIMO (SU-MIMO) operation can be to increase peak data rate per terminal, whereas a main goal in multi-user MIMO (MU-MIMO) can be to increase sector (or service cell) capacity. Operation in each of these classes has advantages. SU-MIMO exploits spatial multiplexing to provide increased throughput and reliability, MU-MIMO exploits multi-user multiplexing (or multi-user diversity) to further gains in capacity. Additionally, MU-MIMO benefits from spatial multiplexing even when user equipment has a single receiver antenna.

Reliability, throughput and capacity gains in SU-MIMO and MU-MIMO depend on available channel state information at the transmitter (CSIT), or channel quality information (CQI), used by a base station scheduler. In a SU-MIMO system, CSIT can be obtained under the assumptions of rank adaptation; successive inter-stream interference cancellation (SIC), if the receiver is capable of performing such cancellations; and no inter-user interference (or other-user interference). On the other hand, CSIT in a MU-MIMO system assumes inter-user interference and absence of SIC and rank adaptation. When a base station services simultaneously single-user MIMO and multi-user MIMO terminals, such a mismatch in the nature of CQI leads to interpretations problems at the scheduler in the access point, which in turn degrades performance. In order to mitigate the CQI mismatch problem, base station(s) can separate user equipment (UE) operating in SU-MIMO mode from UE that operates in MU-MIMO; however, such separation decreases multi-user diversity with the ensuing degradation in performance (e.g. throughput, capacity). Alternatively, terminals may report two sets of CQI, one for each operation mode (SU-MIMO or MU-MIMO), but such alternative would result in excessive feedback overhead and related poor performance.

There is therefore a need for CSIT feedback that minimizes degradation of performance in SU-MIMO and MU-MIMO users operating simultaneously in a cell.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

In accordance with an aspect, an apparatus that operates in a wireless communication environment, the apparatus comprising: a processor configured to evaluate a channel quality indicator (CQI) base layer value ($\langle CQI \rangle$), a CQI offset value ($\langle \Delta CQI \rangle$), to select a virtual or physical antenna set, and to report the evaluated $\langle CQI \rangle$, $\langle \Delta CQI \rangle$ and the selected virtual or physical antenna set; and a memory coupled to the processor for storing the evaluated data. In one example, the processor evaluates the channel quality indicator base layer value by assuming that data layers are symmetrically permuted in frequency-domain or time-domain before being transmitted over a set of multiple virtual antennas, the permutation further assumed to be at least simple cyclic or pseudo-random.

In accordance with an aspect, a method used in wireless communication system, the method comprising: evaluating a CQI base layer value ($\langle CQI \rangle$), and a CQI offset value ($\langle \Delta CQI \rangle$) for a selected set of virtual or physical antennas; and reporting the evaluated $\langle CQI \rangle$, $\langle \Delta CQI \rangle$ and the selected virtual or physical antenna set.

In accordance with an aspect, an electronic device configured to execute the method above.

In accordance with an aspect, an apparatus that operates in a wireless communication environment, the apparatus comprising: means for evaluating a channel quality indicator base layer value ($\langle CQI \rangle$), and a CQI offset value ($\langle \Delta CQI \rangle$), and selecting a virtual or physical antenna; means for quantizing the full value of $\langle CQI \rangle$ to a selected number of bits and quantizing the full value of $\langle \Delta CQI \rangle$ to a smaller selected number of bits; and means for reporting the evaluated $\langle CQI \rangle$, $\langle \Delta CQI \rangle$ and the selected virtual or physical antenna set.

In accordance with an aspect, a machine-readable medium comprising instructions which, when executed by a machine, cause the machine to perform operations including: evaluating a channel quality indicator base layer value ($\langle CQI \rangle$), a CQI offset value ($\langle \Delta CQI \rangle$); selecting a virtual or physical antenna set; and reporting $\langle CQI \rangle$, $\langle \Delta CQI \rangle$, and the set of virtual or physical antennas.

In accordance with an aspect, an apparatus operable in a wireless communication system, the apparatus comprising: a processor, configured to receive a channel quality indicator base layer value ($\langle CQI \rangle$), a CQI offset value ($\langle \Delta CQI \rangle$), and a virtual or physical antenna set selection; and a memory coupled to the processor for storing the received data. In one example, the apparatus further comprises a scheduler component that dynamically determines a user device operates in single-user multiple-input multiple-output mode or multi-user multiple-input multiple-output mode. In another example, the apparatus further comprises a transmitter that applies a symmetric permutation to multiple data layers in frequency-domain or time-domain prior to sending the data layers over a selected virtual antenna set in the single-user multiple-input multiple-output mode; the permutation being at least simple cyclic or pseudo-random. In yet another example, the apparatus further comprises a transmitter that applies a symmetric permutation to multiple data layers in frequency-domain or time-domain prior to sending the data layers over a selected virtual antenna set assigned to each user in a plurality of users in the multi-user multiple-input multiple-output mode, but avoids a symmetric permutation across data layers belonging to disparate users in the plurality of users in the MIMO mode, the permutation being at least simple cyclic or pseudo-random.

In accordance with an aspect, a method used in a wireless communication system, the method comprising: receiving a channel quality indicator base layer value ($\langle CQI \rangle$), a CQI offset value ($\langle \Delta CQI \rangle$), and a virtual or physical antenna set selection; selecting a modulation and coding scheme according to the received base layer value and offset value; and scheduling a terminal in one of single-user multiple-input multiple-output operation mode or multi-user multiple-input multiple-output operation mode based on the received $\langle CQI \rangle$, $\langle \Delta CQI \rangle_n$, and virtual or physical antenna set selection. In one example, the method further comprises applying a symmetric permutation to multiple data layers in frequency-domain or time-domain prior to sending the data layers over a selected virtual antenna set in the single-user multiple-input multiple-output mode; the permutation being at least simple cyclic or pseudo-random. In another example, the method further comprises applying a symmetric permutation to multiple data layers in frequency-domain or time-domain prior to sending the data layers over a selected virtual antenna set assigned to each user in a plurality of users in the multi-user multiple-input multiple-output (MIMO) mode, and avoiding the symmetric permutation across data layers that belong to disparate users in the plurality of users in the MIMO mode; the permutation being at least simple cyclic or pseudo-random.

In accordance with an aspect, an apparatus used in a wireless communication system, comprising: means for receiving a CQI base layer value ($\langle CQI \rangle$), a CQI offset value ($\langle \Delta CQI \rangle$), and a virtual or physical antenna set selection; and means for scheduling a terminal in one of single-user multiple-input multiple-output operation mode or multi-user multiple-input multiple-output operation mode based on the received $\langle CQI \rangle$, $\langle \Delta CQI \rangle$, and virtual or physical antenna set selection. In one example, the apparatus further comprises means for applying a symmetric permutation to multiple data layers in frequency-domain or time-domain prior to sending the data layers over a selected virtual antenna set in the single-user multiple-input multiple-output mode; the permutation being at least simple cyclic or pseudo-random. In another example, the apparatus further comprises means for applying a symmetric permutation to multiple data layers in frequency-domain or time-domain prior to sending the data layers over a selected virtual antenna set assigned to each user in a plurality of users in the multi-user multiple-input multiple-output (MIMO) mode, and means for avoiding the symmetric permutation across data layers that belong to disparate users in the plurality of users in the MIMO mode; the permutation being at least simple cyclic or pseudo-random.

In accordance with an aspect, a machine-readable medium comprising instructions which, when executed by a machine, cause the machine to perform operations including: scheduling a wireless device in one of single-user multiple-input multiple-output operation mode or multi-user multiple-input multiple-output operation mode based on received differential channel quality indicators, and virtual or physical antenna set selection; and optimizing the scheduled resources To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF THE INVENTION

Figure 1:
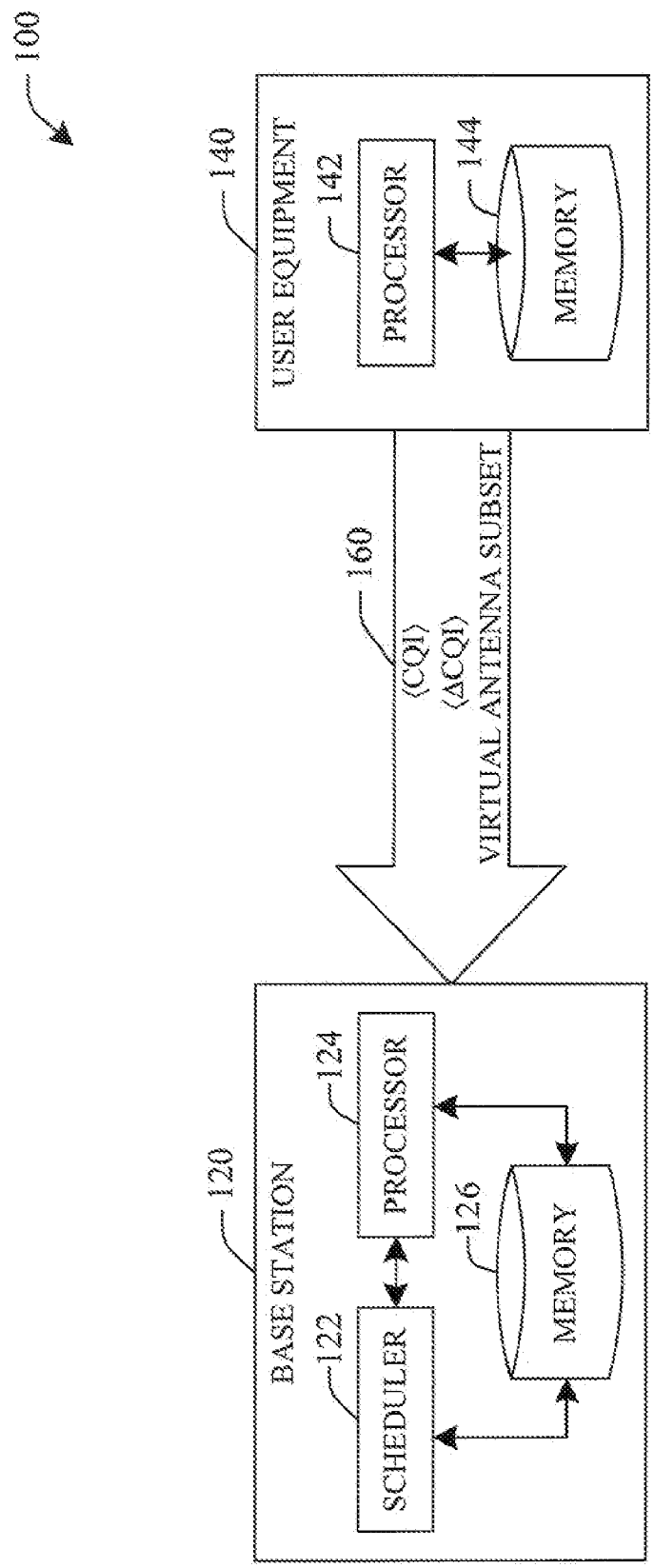
FIG. 1 is a block diagram of a system that facilitates a transmitter to schedule a terminal in SU-MIMO or MU-MIMO operation mode.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The term "intelligence" refers to the ability to reason or draw conclusions about, e.g. infer, the current or future state of a system based on existing information about the system. Artificial intelligence (AI) can be employed to identify a specific context or action, or generate a probability distribution of specific states of a system without human intervention. Artificial intelligence relies on applying advanced mathematical algorithms—e.g., decision trees, neural networks, regression analysis, cluster analysis, genetic algorithm, and reinforced learning—to a set of available data (information) on the system.

As employed herein the word "processor" refers to a classical architecture or a quantum computer. Classical architecture comprises, but is not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Quantum computer architecture may be based on qubitsi embodied in gated or self-assembled quantum dots, nuclear magnetic resonance platforms, superconducting Josephson junctions, etc. Processors can exploit nano-scale architectures such as, but not limited to, molecular and quantum-dot based transistors, switches and gates, in order to optimize space usage or enhance performance of user equipment.

In this description, the term "memory" refers to data stores, algorithm stores, and other information stores such as, but not limited to, image store, digital music and video store, charts and databases. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems and/or methods herein are intended to comprise, without being limited to, these and any other suitable types of memory.

Various embodiments are described herein in connection with a user device. A user device can also be called a system, a subscriber unit, subscriber station, mobile station, mobile device, remote station, access point, base station, remote terminal, access terminal, handset, host, user terminal, terminal, user agent, wireless terminal, wireless communication device, user equipment, or some other terminology. A user device can be a cellular telephone, a cordless telephone, a Session Initiation Protocol (SIP) phone, a wireless local loop (WLL) station, a Personal Digital Assistant (PDA), a handheld device having wireless connection capability, or other processing device(s) connected to a wireless modem.

Moreover, in this description an access point may be a fixed station used for communicating with the terminals and it may also be referred to as Node B, base station, or some other terminology.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

It should be appreciated that techniques described herein can be used for various wireless communication systems such as a frequency division multiple access (FDMA) system, a code division multiple access (CDMA) system, a time division multiple access (TDMA) system, a spatial division multiple access (SDMA) system, an orthogonal FDMA (OFDMA), a single-carrier FDMA (SC-FDMA) system, etc. An OFDMA system utilizes orthogonal frequency division multiplexing (OFDM), in which the telecommunication system bandwidth is divided into multiple frequency bins corresponding to orthogonal subcarriers, also known in the art as tones.

Figure 2:
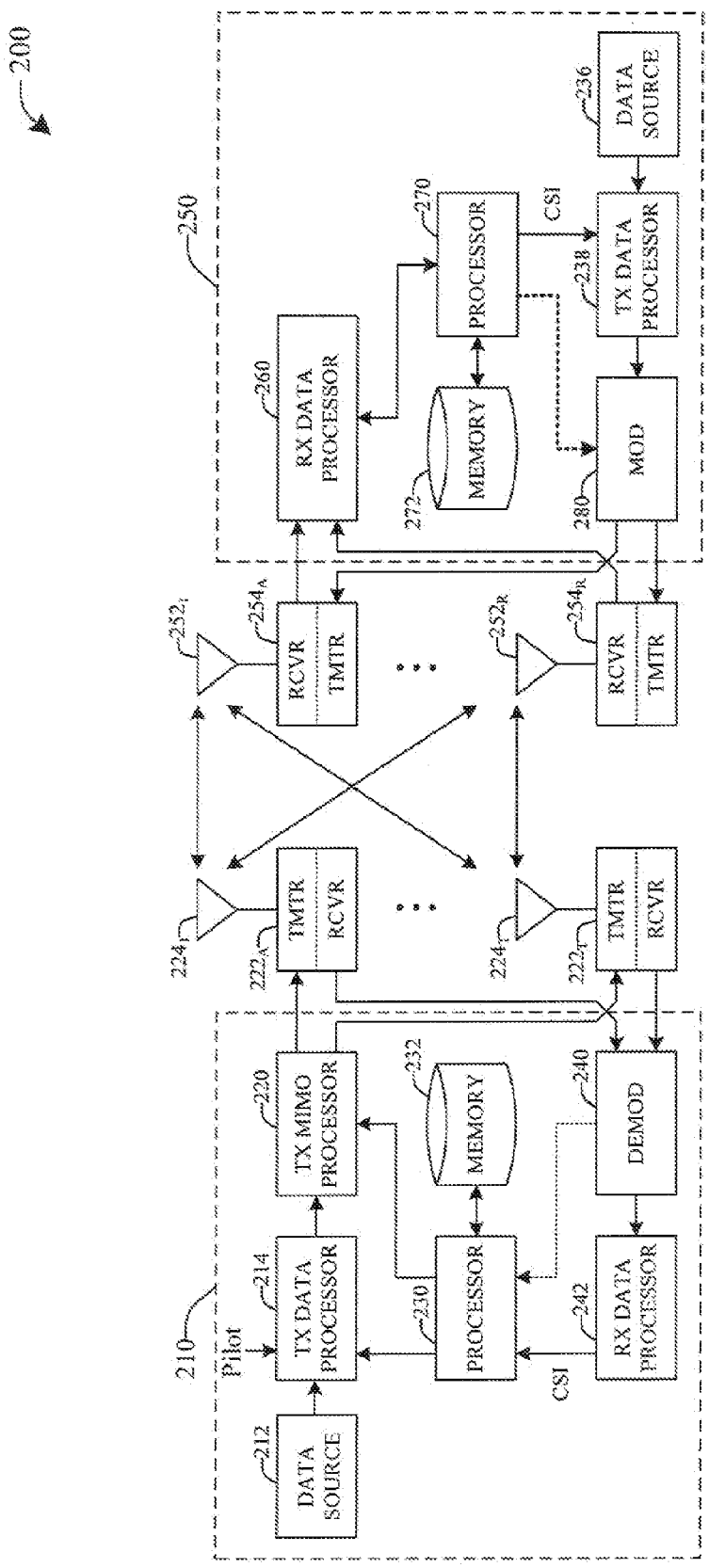
FIG. 2 is a block diagram of MIMO transmitter and a receiver.
Figure 3:
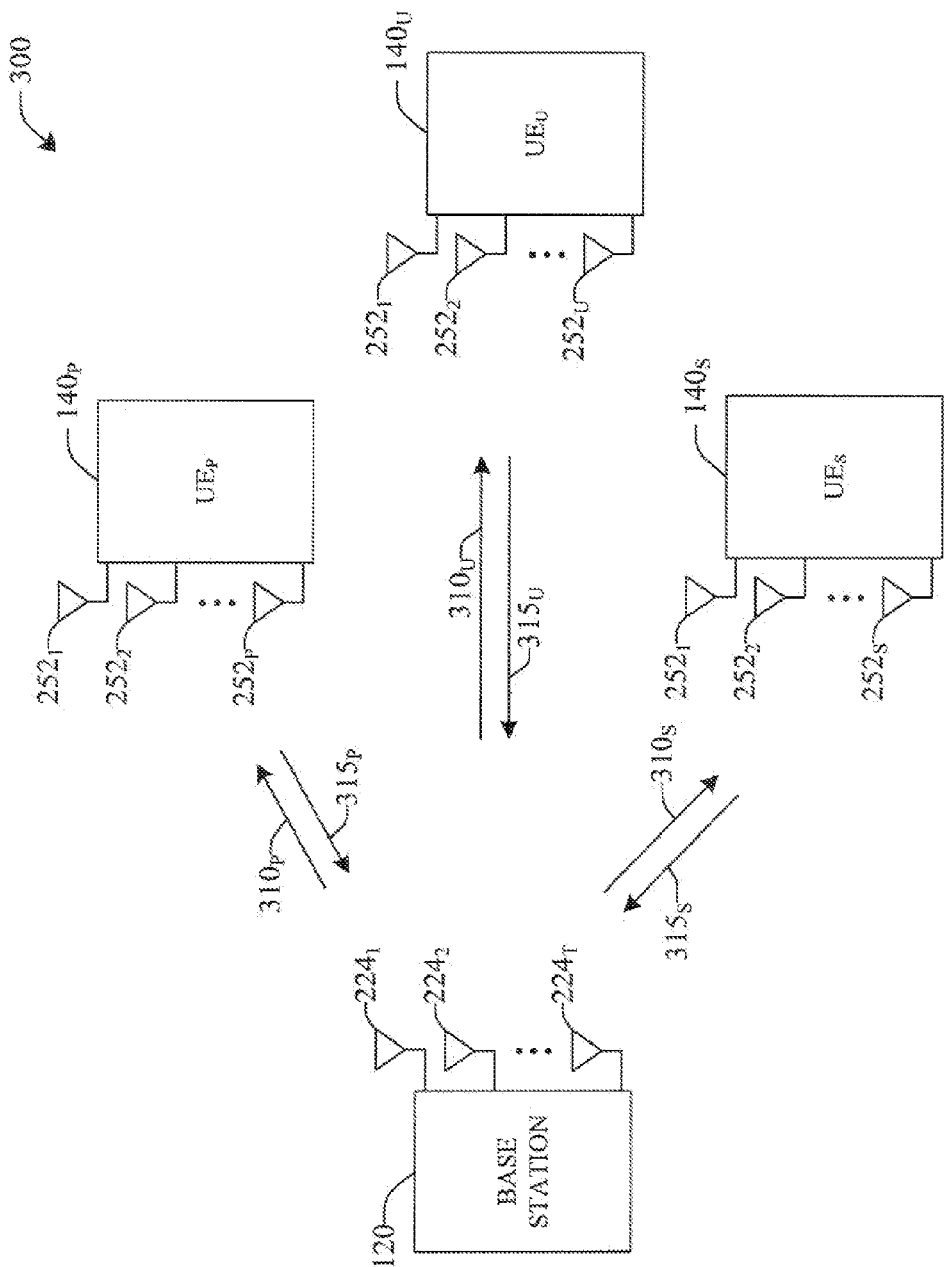
FIG. 3 is a block diagram of a MU-MIMO configuration.

FIG. 1 illustrates a block diagram of a system 100 in which a base station 120 schedules user equipment 140 in SU-MIMO or MU-MIMO operation by using channel state and antenna subset information. User equipment 140 and base station communicate over a wireless forward link (or downlink; not shown) and reverse link 160. User equipment (UE) reports over the reverse link 160 two metrics of channel quality indicator, $\langle CQI \rangle$ and $\langle \Delta CQI \rangle$, and a subset of virtual or physical antennas. $\langle CQI \rangle$ can correspond to a base CQI value. In turn, $\langle \Delta CQI \rangle$ can depend on whether a single or multiple virtual antennas are reported (e.g., rank adaptation). In instances that UE 140 reports multiple virtual antennas (rank>1), $\langle \Delta CQI \rangle$ can be the average over the reported antenna set of the gains afforded by a successive interference correction (SIC) detection scheme [e.g., SIC integrated with minimum mean squared error (MMSE), zero forcing (ZF), or maximal ratio combining (MRC)]. As discussed below in greater detail, such differential reporting can reduce feedback overhead. In an aspect, the CQI channel and the antenna subset indicator channel of the uplink (or reverse link) physical layer can be used to convey the subject information to the base station. Base station 120 receives the channel state information as well as the virtual antenna subset, and based at least in part on this information it can schedule the UE in SU-MIMO or MU-MIMO mode, selecting code rates and constellation sizes appropriate to the reported CQI. An embodiment of SU-MIMO and MU-MIMO systems and their operation modes are discussed below (FIGS. 2 and 3). Virtual antennas correspond to each of the beams that a transmitter (e.g., base station 120) transmits to a user terminal (e.g. user equipment 140) employing physical antennas. Combinations of physical antennas to form a single beam (e.g., beamforming or preceding) can result in a single virtual antenna. Virtual antennas are discussed in greater detail below.

In the user equipment 140, a processor 142 can calculate the CQI metrics. The calculation comprises selecting a performance metric such as signal-to-interference-and-noise-ratio (SINR), throughput, capacity, etc., assuming SU-MIMO operation with space-frequency coding (e.g., OFDM), and computing (i) a CQI value for the first decoded layer or (ii) the average CQI value of the metric over the reported virtual antenna subset. It should be appreciated that SU-MIMO mode with space-time coding is also contemplated. Details of the approach to determining channel state information are presented below. Processor 142 can also facilitate measuring the telecommunication channel in order to determine the number of streams that the UE can receive reliably. As an example, a UE that determines it is difficult to receive two data streams (see below) can then report a single antenna. UE 140 can also comprise a memory 144 coupled to processor 142 for storing data and a plurality of instructions/algorithms (e.g., successive interference cancellation based detection, coding, encryption) that when executed by processor 142 enable reporting the CSIT to the base station 120 in addition to coordinating communication with it.

Base station 120 can comprise a processor 124, a memory 126, and a scheduler 122. As mentioned above, the latter can utilize the channel state information received by the Node B, combined with scheduling algorithms (such as round robin, fair queuing, maximum throughput, proportional fairness, etc.) to schedule dynamically the operation mode of user equipment 140 in either SU-MIMO or MU-MIMO. In addition, the scheduler can determine code rate and constellation size of transmitted data layers based at least in part on reported channel conditions. Processor 124 and memory 126 residing in base station 120 can facilitate telecommunication with user equipment 140. It should be appreciated that scheduler 122 can be a part of processor 124, and that other components are present in base station 120, as discussed below.

FIG. 2 is a block diagram of an embodiment of a transmitter system 210 (such as Node B) and a receiver system 250 (e.g., user equipment) in a MIMO system 200. At the transmitter system 210, traffic data for a number of data streams can be provided from a data source 212 to transmit (TX) data processor 214. In an embodiment, each data stream is transmitted over a respective transmit antenna. TX data processor 214 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and can be used at the receiver system to estimate the channel response. The multiplexed pilot and coded data for each data stream is then modulated (e.g., symbol mapped) based on a particular modulation scheme [e.g., binary phase-shift keying (BPSK), quadrature phase-shift keying (QPSK), multiple phase-shift keying (M-PSK), or m-order quadrature amplitude modulation (M-QAM)] selected for that data stream to provide modulation symbols. The data rate, coding, and modulation for each data stream may be determined by instructions executed by processor 230.

The modulation symbols for all data streams are then provided to a TX MIMO processor 220, which may further process the modulation symbols (e.g. OFDM). TX MIMO processor 220 then provides $N_T$ modulation symbol streams to $N_T$ transmitters (TMTR) 222a through 222t. In certain embodiments, TX MIMO processor 220 applies beamforming weights (or precoding) to the symbols of the data streams and to the antenna from which the symbol is being transmitted. Each transmitter 222 receives and processes a respective symbol stream to provide one or more analog signals, and further conditions (e.g. amplifies, filters, and upconverts) the analog signals to provide a modulated signal suitable for transmission over the MIMO channel. $N_T$ modulated signals from transmitters $222_A$ through $222_T$ are then transmitted from $N_T$ antennas $224_1$ through $224_T$, respectively. At receiver system 250, the transmitted modulated signals are received by $N_R$ antennas $252_1$ through $252_R$ and the received signal from each antenna 252 is provided to a respective receiver (RCVR) $254_A$ through $254_R$. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210. A processor 270 periodically determines which pre-coding matrix to use (discussed below). Processor 270 formulates a reverse link message comprising a matrix index portion and a rank value portion. The reverse link message may comprise various types of information regarding the communication link or the received data stream, or a combination thereof. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights and processes the extracted message.

Single-user MIMO mode of operation corresponds to the case in which a single receiver system 250 communicates with transmitter system 210, as illustrated in FIG. 2 and according to the operation described above. In such a system, the $N_T$ transmitters $224_1$-$224_T$ (also known as TX antennas) and $N_R$ receivers $252_1$-$252_R$ (also known as RX antennas) form a matrix channel (e.g., Rayleigh channel, or Gaussian channel) for wireless communication. The channel is described by a $N_R \times N_T$ matrix of random complex numbers. The rank of the SU-MIMO channel equals the algebraic rank of the $N_R \times N_T$ channel. In space-time or space-frequency coding, the rank equals the number of data streams, or layers, that are sent over the channel. It should be appreciated that the rank is at most equal to min $\{N_T, N_R\}$.

In one aspect, transmitted/received symbols with OFDM, at tone ω, can be modeled by:

$$y(\omega) = H(\omega)c(\omega) + n(\omega). \tag{1}$$

Here, y(ω) is the received data stream and is a $N_R \times 1$ vector, H(ω) is the channel response $N_R \times N_T$ matrix at tone ω (e.g., the Fourier transform of the time-dependent channel response matrix h), c(ω) is an $N_T \times 1$ output symbol vector, and n(ω) is an $N_R \times 1$ noise vector (e.g., additive white Gaussian noise). It should be appreciated that c(ω) is the result of at least one multiplexing scheme, and at least one pre-coding (or beamforming) scheme applied by the transmitter. Precoding can convert a $N_V \times 1$ layer vector to $N_T \times 1$ precoding output vector. $N_V$ is the actual number of data streams (layers) transmitted by transmitter 210, and $N_V$ can be scheduled (with a scheduler such as 122) at the discretion of the transmitter (e.g., Node B) based at least in part on channel conditions and the rank reported by the terminal. Additionally, c(ω) is multiplied by a power gain matrix, which determines the amount of power transmitter 210 allocates to transmit each data stream $N_V$. The net power employed in the transmission is upper-bounded by the regulated value of transmit power for transmitter.

FIG. 3 illustrates a MU-MIMO system 300 in which three UEs 140$_P$, 140$_U$, and 140$_S$ communicate with a base station 120. Base station has N$_T$ TX antennas, and each of the UE has multiple RX antennas; namely, UE$_P$ has N$_P$ antennas 252$_1$-252$_P$, UE$_U$ has N$_U$ antennas 252$_1$-252$_U$, and UE$_S$ has N$_S$ antennas 252$_1$-252$_S$. Communication between terminals and the base station is effected through uplinks 315$_P$, 315$_U$, and 315$_S$. Similarly, downlinks 310$_P$, 310$_U$, and 310$_S$ facilitate communication between the base station 120 and the terminals UE$_P$, UE$_U$, and UE$_S$, respectively. Additionally, communication between each terminal and base station is implemented in substantially the same manner, through substantially the same components, as illustrated in FIG. 2 and its corresponding description. Because terminals can be located in substantially different locations within the cell serviced by base station 120, each terminal 140$_P$, 140$_U$, and 140$_S$ has its own matrix channel $h_\alpha$ and response matrix $H_\alpha$ ($\alpha$=P, U, and S), with its own rank. Intra-cell interference (e.g., other-user interference) can be present due to the plurality of users present in the cell serviced by base station 120. Although illustrated with three terminals in FIG. 3, it should be appreciated that a MU-MIMO system can comprise any number of terminals, indicated below with index k.

In one aspect, transmitted/received symbols with OFDM, at tone ω and for user k, can be modeled by:

$$y_k(\omega) = H_k(\omega) c_k(\omega) + H_k(\omega) \Sigma' c_m(\omega) + n_k(\omega). \quad (2)$$

Here, symbols have the same meaning as in Eq. (1). It should be appreciated that due to multi-user diversity, other-user interference in the signal received by user k is modeled with the second term in the right-hand side of Eq. (2). The prime (') symbol indicates that transmitted symbol vector $c_k$ is excluded from the summation. The terms in the series represent reception by user k (through its channel response $H_k$) of symbols transmitted by a transmitter (e.g., base station 120) to the other users in the cell. Other-user interference determines at least in part the channel conditions, and thus it is readily apparent that channel state information determined in MU-MIMO operation can be intrinsically different from CSIT in SU-MIMO operation.

Figure 4:
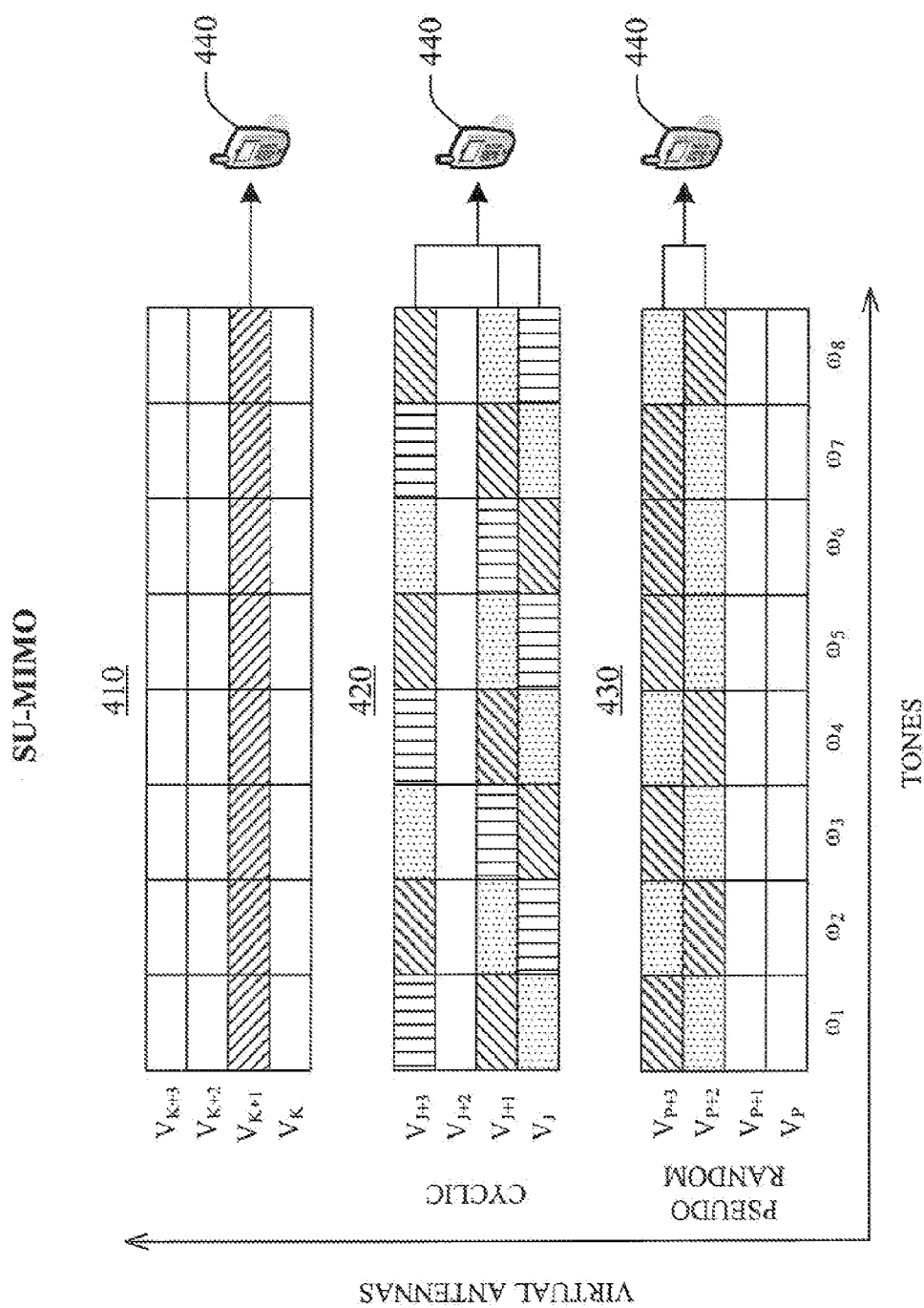
FIG. 4 illustrates snapshot diagrams of multi-codeword data transmission in the SU-MIMO mode with OFDM, with layer permutation.

FIG. 4 illustrates snapshot diagrams of multi-codeword data stream transmission in SU-MIMO mode with OFDM. A transmitter (e.g., base station 120; not shown) sends data to a UE 440 scheduled in the SU-MIMO mode. Data streams are transmitted via a subset of selected virtual antennas. Exemplary diagram 410 illustrates a single data stream transmitted over eight tones $\omega_1$-$\omega_8$ to a single user terminal 440 employing a single virtual antenna $V_{K+1}$. It should be appreciated that other number of tones or subcarriers are possible depending on parameters such as communication bandwidth. Additionally, exemplary diagrams 420 and 430 illustrate, respectively, a cyclic 3-layer ($V_J$, $V_{J+1}$, $V_{J+3}$) permutation and a pseudo-random 2-layer ($V_{P+2}$, $V_{P+3}$) permutation. Below, virtual antenna and permutation are described. Data streams are transmitted to UE 440. It should be appreciated that in space-frequency diagrams 410-430 only four possible virtual antennas are illustrated, however, the full (ordinate) size of the diagrams is N$_T$. Additionally, the selected virtual antennas are illustrated generically, e.g., antennas $V_{P+2}$ and $V_{P+3}$ can represent any particular possible combination of the physical antennas.

Virtual antennas.—A virtual antenna is defined as a beam created by a transmitter (e.g., a base station 120) using the set of multiple physical antennas (e.g. N$_T$ TX antennas). Transmitter generates those beams such that channel statistics is preserved and power is equally distributed among physical antennas. Virtual antennas can be introduced to exploit equally all available physical TX antennas at a transmitter. The total number N$_V$ of virtual antennas employed to transmit data streams dictates the maximum spatial diversity or multiplexing order that can be exploited in the SU-MIMO operation. In an aspect, in order to define virtual antennas that equally exploit N$_T$ physical antennas at the transmitter, an N$_T$×N$_T$ unitary matrix U(U$^H$U=UU$^H$=1, where 1 is the N$_T$×N$_T$ identity matrix, and U$^H$ is the Hermitian conjugate of U) is used. This unitary matrix rotates the fictitious vector of physical antennas given by (N$_1$, N$_2$, ..., N$_{T-1}$, N$_T$). Thus, such rotation is an effective form of precoding in which multi-user diversity and layer separation can be exploited by adequately rotating, through selecting the adequate U, the radiation polarization pattern of each of the physical antennas. It should be appreciated that actual precoding requires knowledge of channel conditions, reported by a terminal, but matrix U can be defined without such knowledge. In another aspect, U can be chosen to be orthonormal (UU$^H$=1), with pseudorandom constant modulus entries. It should be appreciated that other matrices that preserve the norm of the fictitious (N$_1$, N$_2$, ..., N$_{T-1}$, N$_T$) vector are possible. Signaling at the transmitter employing virtual antennas can be accomplished by a processor (e.g., processor 124) or a dedicated virtual signaling component. Additionally, selection of a virtual antenna set can be based at least in part on computing performance metrics (e.g. SINR, capacity) for different virtual antenna configurations and selecting the configuration that maximizes performance.

The number of available virtual antenna subsets [n(V)] depends on both N$_T$ and N$_R$:

$$n(V) = \sum_{1 \leq q \leq \min\{NT, NR\}} N_T! [q!(N_T - q)!]^{-1}, \quad (3)$$

where n!=1·2 ... (n−1)·n is the factorial function for integer number n. For a symmetric (N$_T$, N$_R$=N$_T$) configuration of TX and RX antennas, Eq. (3) predicts n(V)=2$^{N_T}$−1 possible non-equivalent sets of virtual antennas. Each of these sets has N$_V$ virtual antennas, with 1≦N$_V$≦min{N$_T$, N$_R$}. It should be appreciated that Eq. (3) predicts that by using N$_T$ bits, a receiver (e.g., UE 140) can feed back to a transmitter (e.g., base station 120) the index of a preferred virtual antenna subset. It should also be appreciated that when a subset of the virtual antennas is not reported by a receiver, and a symmetric transmit configuration is employed, the transmitter can use the one virtual antenna subset that coincides with the set of (active) transmit physical antennas.

Figure 6A:
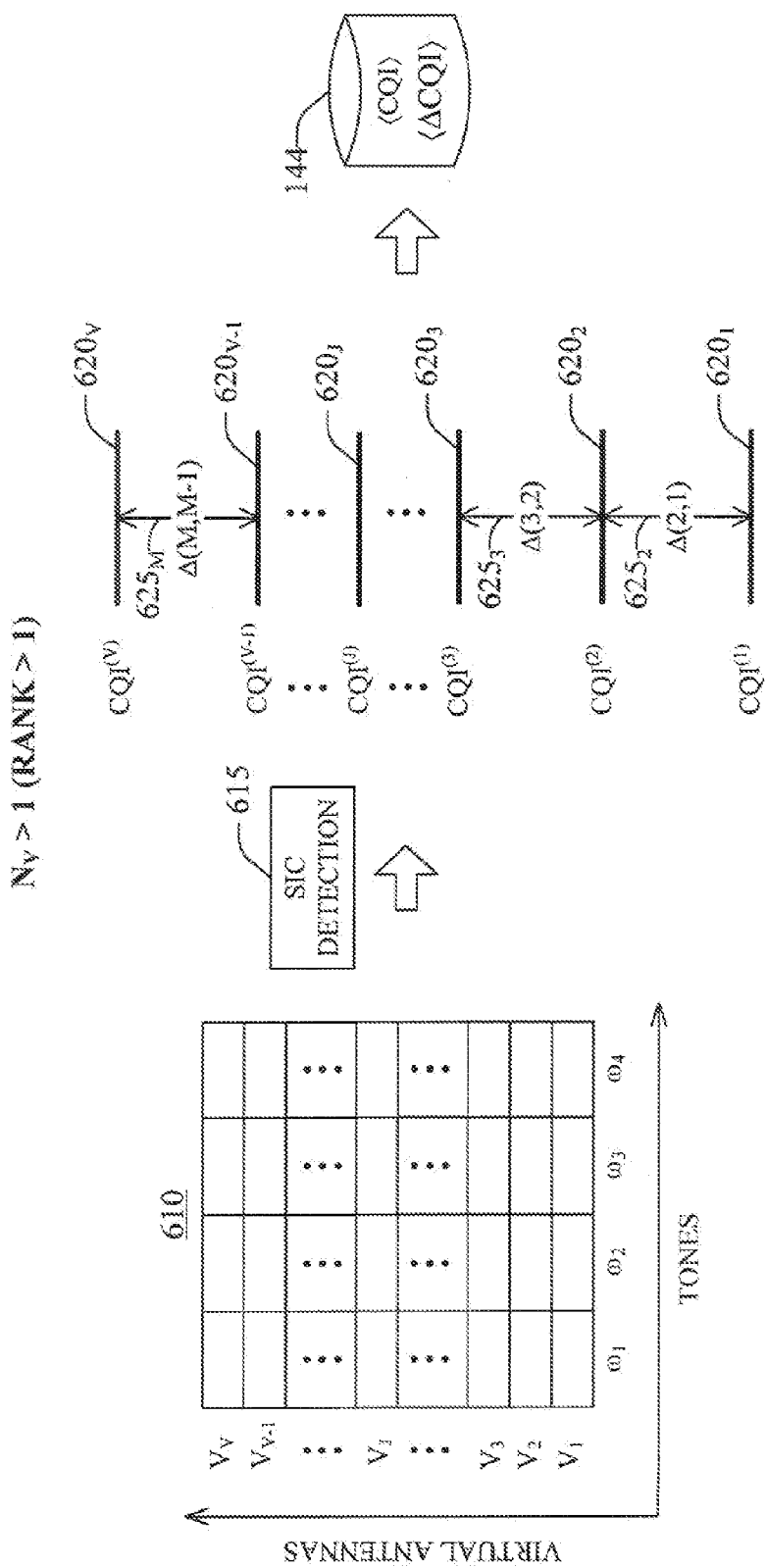
FIGS. 6A and 6B illustrate determining channel state information in SU-MIMO and MU-MIMO mode.
Figure 6B:
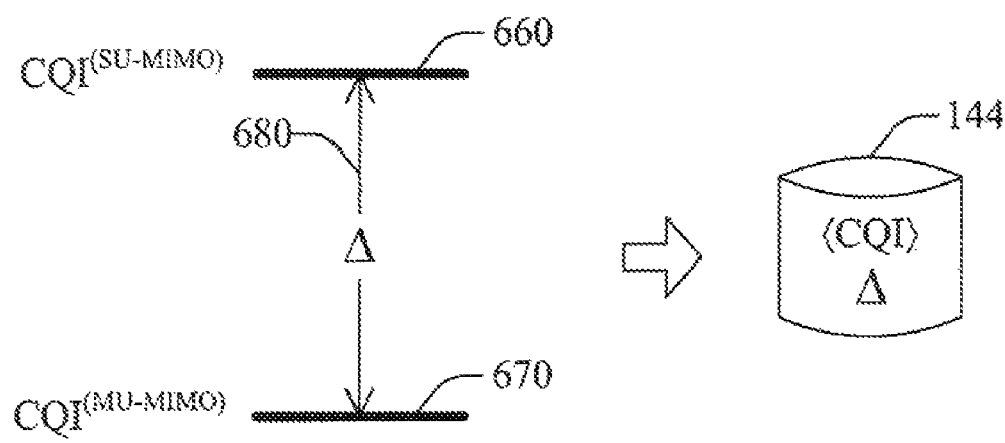

Layer permutation.—Permutation of layers among virtual antennas can be performed to exploit spatial diversity and attain near-uniform channel quality. By attaining small fluctuations among channel quality in different layers, SIC detection can be exploited to efficiently report (through reduced feedback overhead) channel state information, and to afford a base station the possibility to schedule simultaneously SU-MIMO and MU-MIMO users, as discussed in greater detail below (FIGS. 6A and 6B). Permutation of codewords is applied in each tone ω, and such permutations are described by a permutation matrix of size N$_V$×N$_V$. Simple cyclic permutations (e.g., mapping 420) are more suitable for small number of carriers, whereas pseudo-random permutation (e.g., mapping 430) can be employed when the number of carriers is large. For a large number of tones, randomization is expected to distribute codewords of data streams nearly uniformly over selected virtual antennas. It should be appreciated that mappings 420 and 430 are exemplary, and other mapping schemes of layers to virtual antennas can be used as long as fluctuations in CQI among layer are substantially reduced. Permutation of layers is accomplished by a processor (e.g., processor 124). It should be appreciated that data layer permutation can also be applied in time-domain.

Figure 5:
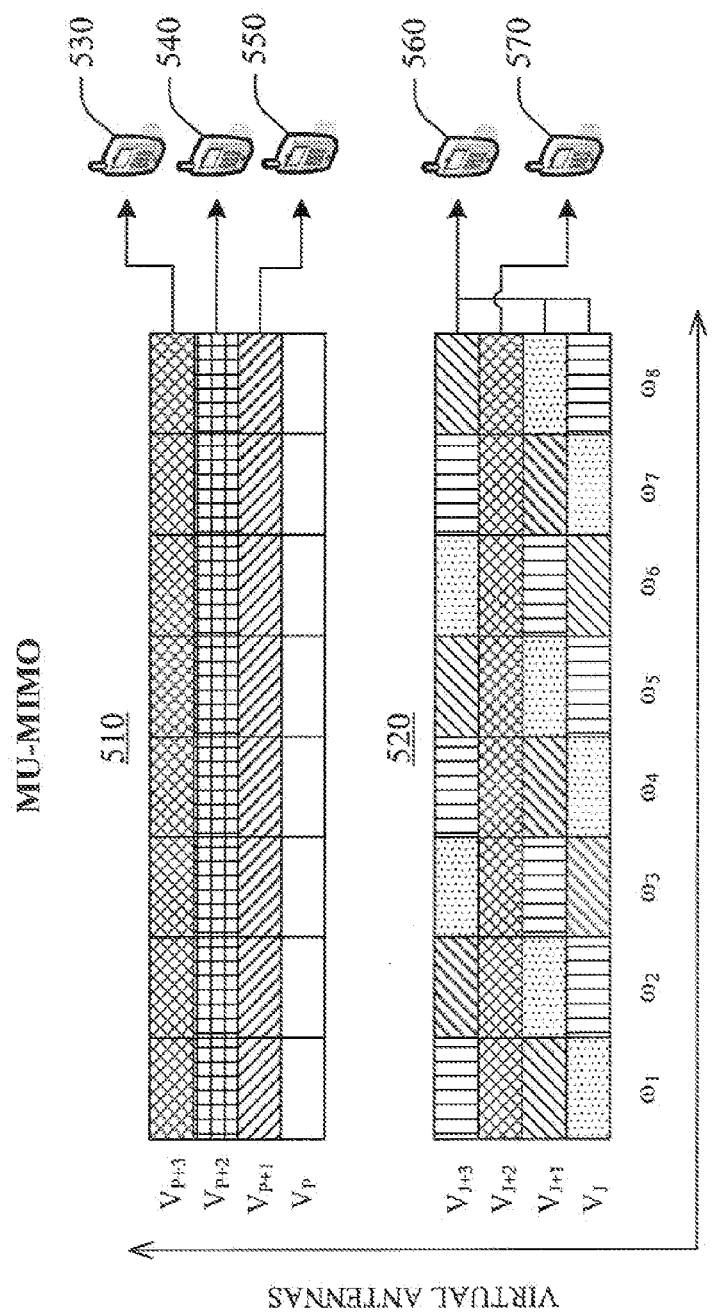
FIG. 5 illustrates snapshot diagrams of multi-codeword data transmission in the MU-MIMO mode with OFDM, where terminals receive multiple data streams with layer permutation.

FIG. 5 illustrates snapshot diagrams of multi-codeword data stream transmission in MU-MIMO mode with OFDM. In exemplary diagram 510, terminals are scheduled to operate in MU-MIMO with a single virtual antenna selected. In such a case, base station assigns a single virtual antenna to each terminal scheduled in MU-MIMO. In diagram 510 three data streams are transmitted to three terminals 530, 540, and 550, and there is no layer permutation for any of the tones $\omega_1$-$\omega_8$. Diagram 520 illustrates two terminals 560, 570 operating in MU-MIMO where terminal 560 received multiple data streams ($V_J$, $V_{J+1}$, and $V_{J+3}$), with an exemplary cyclic layer permutation, and terminal 570 receives a single data stream.

FIG. 6A illustrates channel quality indicators that are computed in case a receiver (e.g., wireless device) reports a subset of virtual antennas with $N_V>1$. In exemplary diagram 610, SU-MIMO multi-codeword transmission of data streams utilizes all of a selected subset of virtual antennas $V_1$-$V_V$, and employs permutation (not shown) as discussed above. When detection of the data streams does not involve successive interference cancellation, virtual antenna selection and layer permutation can result in nearly-uniform channel quality indicators for each of the layers involved in transmission. Alternatively, when detection of symbols at the receiver (e.g., user equipment 140) includes SIC detection 615 (e.g. SIC integrated with MMSE, ZF, or MRC) implemented by a processor (e.g., processor 142) or other component such as an equalizer, the SIC gains in CQI between successively detected layers result in a quality indicator ladder $620_1$-$620_M$: $CQI^{(J)}$ for layer J, corresponding to virtual antenna J, presents gains $\Delta(J,J-1)$ with respect to $CQI^{(J-1)}$, $CQI^{(J+1)}$ presents gains with respect to $CQI^{(J)}$, and so on. It should be appreciated that SIC gains $625_1$-$625_J$ between successively detected layers (the "rungs" of the quality indicator ladder) depend on the virtual antenna index J=1, 2, ..., M-1, and are not necessarily equal as illustrated in FIG. 6A. Additionally, in the quality indicator ladder present in FIG. 6A, it is assumed that layer $V_1$ is detected first, then $V_2$, and so on. Additionally, the "ladder" can start at any selected virtual antenna (or layer) that is determined to be the first one to be detected. In an aspect, CQI can correspond to an effective SINR, e.g. an average (over tones; e.g. $\omega_1$-$\omega_4$ in 610) capacity metric.

To reduce channel condition uplink feedback overhead, a differential CQI method is employed. In this method, the full CQI value ($\langle CQI \rangle$) of the base layer (e.g., the first detected layer or first rung in the quality indicator ladder) is quantized to X bits (e.g., value is represented with $2^X$ symbols) and reported, and the CQI value of layer J in the ladder is estimated as $$CQI^{(J)} = \langle CQI \rangle + (J-1)\langle \Delta CQI \rangle. \qquad (4)$$

$\langle \Delta CQI \rangle$ is the average of the SIC gains (e.g., $425_1$-$425_V$ when using $N_V$ layers) over the selected set of virtual antennas, quantized to Y bits (e.g., value is represented with $2^Y$ symbols) with typically Y<X. The average can be computed by processor 142. [It should be appreciated that Eq. (4) defines formally the quality indicator ladder.] Quantization of $\langle CQI \rangle$ and $\langle \Delta CQI \rangle$ can be performed by processor 142. In addition, full and differential values of $\langle CQI \rangle$ and $\langle \Delta CQI \rangle$ can be stored in memory 144. It should be appreciated that in an aspect, the CQI values of the layers used to transmit data (e.g., $620_1$-$620_V$) without assuming any SIC can be averaged over the subset of virtual antennas selected for transmission (e.g., $V_1$-$V_V$ in FIG. 6A) and such average CQI can be first quantized and then assigned to $\langle CQI \rangle$. The average computed by processor 142. This differential reporting approach can reduce overhead significantly: An exemplary 5-bit quantization for $\langle CQI \rangle$ and 3-bit quantization for $\langle \Delta CQI \rangle$ results in 8-bit feedback overhead, whereas reporting full CQI values at this level of quantization would demand $5N_V$ bits; for $N_V=4$, differential reporting results in a 60% reduction in overhead.

FIG. 6B illustrates channel quality indicators that are computed in case a receiver (e.g., user equipment 140) reports a single virtual antenna ($N_V=1$). As mentioned above, a terminal measures the telecommunication channel to determine whether multiple virtual antennas or a single antenna can be requested (and reported). When terminal reports one virtual antenna, $\langle \Delta CQI \rangle$ as introduced above becomes ill defined and loses its reporting value. In such instance, $\langle \Delta CQI \rangle$ is assigned a value that corresponds to the offset $\Delta$ 480 (measured in dB) between the CQI in MU-MIMO mode 470 and the (single) base layer CQI 460 assuming rank-1 SU-MIMO operation. The base layer CQI is determined assuming that there is no inter-stream interference and the entire transmit power is allocated to the selected virtual antenna. More specifically, the base layer SU-MIMO CQI [$CQI^{(SU-MIMO)}$] for $N_V=1$ is computed assuming that (i) the transmit power is P, where P is the transmit power of the base station, and (ii) inter-user interferences are not present. On the other hand, MU-MIMO operation typically assumes that transmit power is uniformly distributed to $N_T$ antennas and inter-user interferences are present. The base layer $\langle CQI \rangle$ corresponds to $CQI^{(SU-MIMO)}$.

The terminal reports $\langle CQI \rangle$ and $\langle \Delta CQI \rangle = \Delta$ through the uplink (UL) physical (PHY) layer CQI channel. It should be appreciated that from such differential reporting a transmitter can access MU-MIMO CQI for those UEs that report rank 1. Values of the offset $\Delta$ and base, single layer CQI can be stored in the memory 144 of the reporting terminal. Such reported information optimizes the MU-MIMO mode of operation when each of the scheduled terminals reported a single virtual antenna (e.g., rank is 1). It should be appreciated that rank 1 can be a common and important case in MU-MIMO mode. A Node-B (e.g., base station 120) can schedule terminals (e.g., user equipment 140) that reported different single virtual antennas together in MU-MIMO mode (see, e.g., exemplary diagram 510). In one aspect, SINR can be used as a metric of CQI and a transmitter selects the modulation coding scheme (MCS) by mapping to the MCS table to the following computed SINR (in dB):

$$SINR_m(UE) = CQI_m^{(SU-MIMO)} - \Delta + f(N_T, N(UE)), \qquad (5)$$

where m=0, 1, ..., N(UE)-1, N(UE) is the number of scheduled terminals and $f(N_T, N(UE))$ is a power allocation adjustment term which depends on the number of transmit antennas and the number of scheduled terminals.

Figure 7:
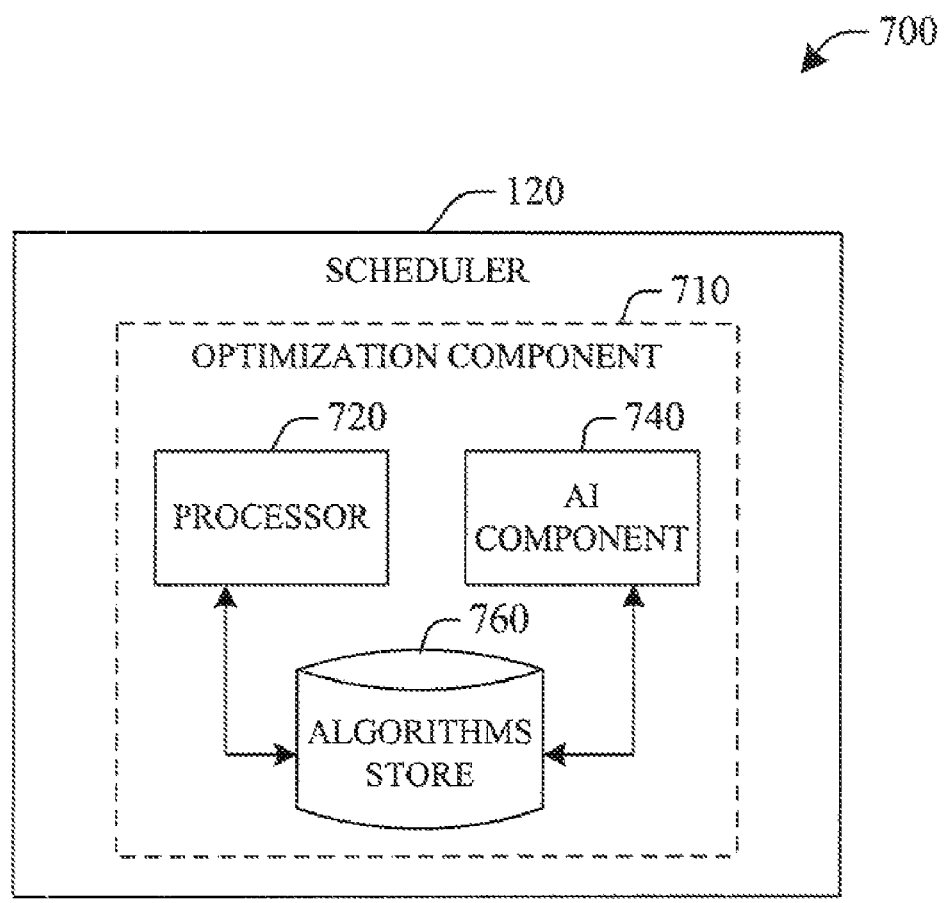
FIG. 7 is a block diagram of a scheduler that optimizes scheduling decisions of telecommunication resources.

FIG. 7 illustrates an exemplary scheduler 120 that optimizes scheduling decisions through optimization component 710. Such optimization component comprises a processor 720, an AI component 740, and algorithms store 760. Scheduler 120 employs processor 720 to schedule the operation mode and to maintain the fairness between SU-MIMO users and MU-MIMO users. As discussed above, scheduler 120 can receives CQI that can be used to optimally schedule a terminal in either SU-MIMO mode with multiple streams, or MU-MIMO mode with one stream per terminal. Processor 720 can employ peak data rate as a metric to optimally schedule users. As an example, processor 720 can avoid scheduling a UE that reports high rank, multiple virtual antennas in the MU-MIMO mode; instead, such UE can be delayed in its service in order to garner the benefit of high peak data rate when multiple virtual antennas become available solely for the UE. Alternatively, processor 720 can schedule more readily a UE that reports only a single virtual antenna (rank 1) or low rank at the expense of low peak data rate. It should be appreciated that processor 720 can employ a plurality of metrics to optimally schedule a user in SU-MIMO or MU-MIMO mode.

Processor 720 can also schedule one or more terminals sub-optimally. Such choice, nonetheless, can result in reducing possible delays which can actually lead to an effectively higher quality of service from the perspective of a user. As an example, providing users of latency-sensitive applications, such as voice communication or multi-player gaming, with a steady flow of data can justify processor 720 scheduling terminals in sub-optimal conditions. Within the differential reporting approach for CQI in SU-MIMO and MU-MIMO disclosed herein, MU-MIMO sub-optimal scheduling can arise as follows. Scheduler 120 (via processor 720) schedules in MU-MIMO mode a UE who reported multiple virtual antennas, and allocates for that UE the reported virtual antenna subset; however, the scheduled UE generated the reported $\langle CQI \rangle$ under the assumption of no inter-user interference. Thus, operation of such terminal in MU-MIMO can be negatively affected by the actually present inter-user interference in the cell. To mitigate such sub-optimality, the base station can (i) use beamforming or precoding to minimize inter-user interference, or (ii) set a lower MCS than that consistent with $\langle CQI \rangle$ and $\langle \Delta CQI \rangle$ when it schedules a terminal in MU-MIMO mode. As an example, strategy (i) is expected to work well in cases in which multiple streams are sent to simultaneously scheduled MU-MIMO UEs that reported mutually exclusive virtual antenna sets. Namely, in a (4,4) configuration, terminal A reports virtual antenna set $\{V(A)_1\}=\{1\}$, terminal B requests set $\{V^{(B)}_1, V^{(B)}_2\}=\{2,3\}$, and terminal C reports $\{V^{(C)}_1\}=\{4\}$. It should be appreciated that the UEs (e.g., terminals A and C) who reported a single virtual antenna can still be optimally operated in MU-MIMO mode by using the adequately generated $\langle CQI \rangle$ and $\Delta$ (FIG. 6B) even when beamforming or precoding cannot satisfactorily remove the inter-user interference.

Another sub-optimal MU-MIMO scheduling can occur when the scheduler 120 schedules a UE that reported multiple virtual antennas but only allocates a strict subset of the reported set. As an example, processor 720 schedules a terminal that reported virtual antennas set $\{V_P, V_{P+3}\}$ in the MU-MIMO mode, allocating for the UE only virtual antenna $V_P$. Desirably, scheduler 120 ought to avoid such a situation by scheduling the UE in another frame. Notwithstanding, it should be appreciated that even if such a sub-optimal situation occurs, the terminal still may succeed at decoding if the scheduler sets the MCS according to $\langle CQI \rangle$. To improve the likelihood of decoding success in such MU-MIMO sub-optimal scheduling situation, the unified approach to SU-MIMO/MU-MIMO operation described herein can contemplate reporting the best virtual antenna in addition to the virtual antenna set. The best virtual antenna can be identified by computing a CQI metric over all possible virtual antennas. Computation can be performed by processor 142. The increase in feedback overhead by reporting the best antenna index is negligible, as it is illustrated in the following examples: (i) In the case of $N_T=2$ physical transmit antennas, 2 bits are needed to report one of the possible nonequivalent virtual antenna subsets $\{1\}$, $\{2\}$, or $\{1,2\}$. However, with two bits it is possible to convey four distinct configurations. Thus, without increasing feedback overhead it is possible to report the preferred virtual antenna set and the best virtual antenna. (ii) In the (4,2) configuration, 4 bits are needed to report one of 10 virtual antenna subsets. By extending the 10 choices—4 single-antenna choices, and 6 two-antenna choices; no three- or four-antenna choices are possible—to 16, the best antenna index in addition to the virtual antenna set can be reported without increasing the feedback overhead. (iii) In (4,4) case there are 15 available virtual antenna sets. Four bits are needed to report one of those sets, and 1 additional bit is necessary to report the best virtual antenna in addition to the preferred virtual antenna set. Knowledge of the best virtual antenna at the base station can mitigate the above mentioned sub-optimal MU-MIMO scheduling by allocating to the terminal the best antenna instead of an arbitrary antenna in the reported virtual antenna set. By receiving signal via the best antenna, the terminal can decode signal transmitted by the base station with an MCS consistent with $\langle CQI \rangle$. Additionally, more aggressive MCS selection can be possible in this case.

Processor 720 employs optimization/scheduling algorithms stored in store 760 to determine whether to delay or schedule a UE in either optimal or sub-optimal operation mode. Algorithm store 760 contains classical (e.g., round robin, fair queuing, proportional fairness, and maximum throughput scheduling) and quantum algorithms (e.g., quantum genetic algorithm) for optimization/scheduling. As optimal scheduling can involve exhaustive inspection of performance metrics, the computation demand or "hardness" of the scheduling problem can grow exponentially with the number of users in the cell. Thus, quantum algorithms can solve such problems with significant speed-up when compared to classical algorithms. In an aspect, algorithms in store 760 can be downloaded to, or uploaded from, other schedulers by processor 720. In another aspect, algorithms can be executed in parallel by a plurality of processors residing in schedulers located in remote base stations (e.g. other than Node B 120). Such parallel execution of the scheduling or optimization algorithm reduces the computational demand on processor 720 and speeds up the scheduling decision. It should be appreciated that in this parallel computation, processors in base stations with low loads can be exploited to enhance speed up in the calculation.

Artificial intelligence component 740 can use historical scheduling data or can perform utility analysis (e.g., cost-benefit analysis, where cost may be represented by power consumption at the terminal) to infer optimal allocation of resources (e.g., code rate, constellation size, virtual antenna set, power); or can use such historical data as a supervised training set to learn scheduling decision-making. It should be appreciated that cost-analysis can entail evaluation of large groups of scheduling scenarios; in such case, advanced optimization algorithms such as genetic algorithms can be employed by the AI component. In particular, the AI component 248 can employ one of numerous methodologies for learning from data and then drawing inferences from the models so constructed, e.g. Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing scheduling described herein. Additionally, AI component 740 can infer when sub-optimal allocation of users is adequate in order to benefit from peak data rate, or cell throughput. The artificial intelligence component can infer adaptive design of scheduling algorithms based on combining existing algorithms for improved optimization performance, based at least in part on pattern of resource utilization at the transmitter or terminal (e.g., power consumption). It should be appreciated that the word "adaptive" as used herein refers to performing or effecting changes to adjust to a specific set of conditions in order to improve such conditions. Additionally, AI component can analyze algorithms contained in other schedulers and request processor 720 to upload such algorithms based on characteristic parameters thereof (e.g., creation date, version, programming model, etc.). In one aspect, adaptive design can rely on object-oriented classical algorithms stored in the algorithm store 760 or stores located in other schedulers in remote base stations. In another aspect, a hybrid classical-quantum algorithm can be designed. AI component 740 can employ historical data on reported virtual antenna subsets by subscribers in a cell in order to identify spatial and temporal (e.g., seasonal) patterns of resource demand, or greedy users who consistently report the highest rank.

Figure 8:
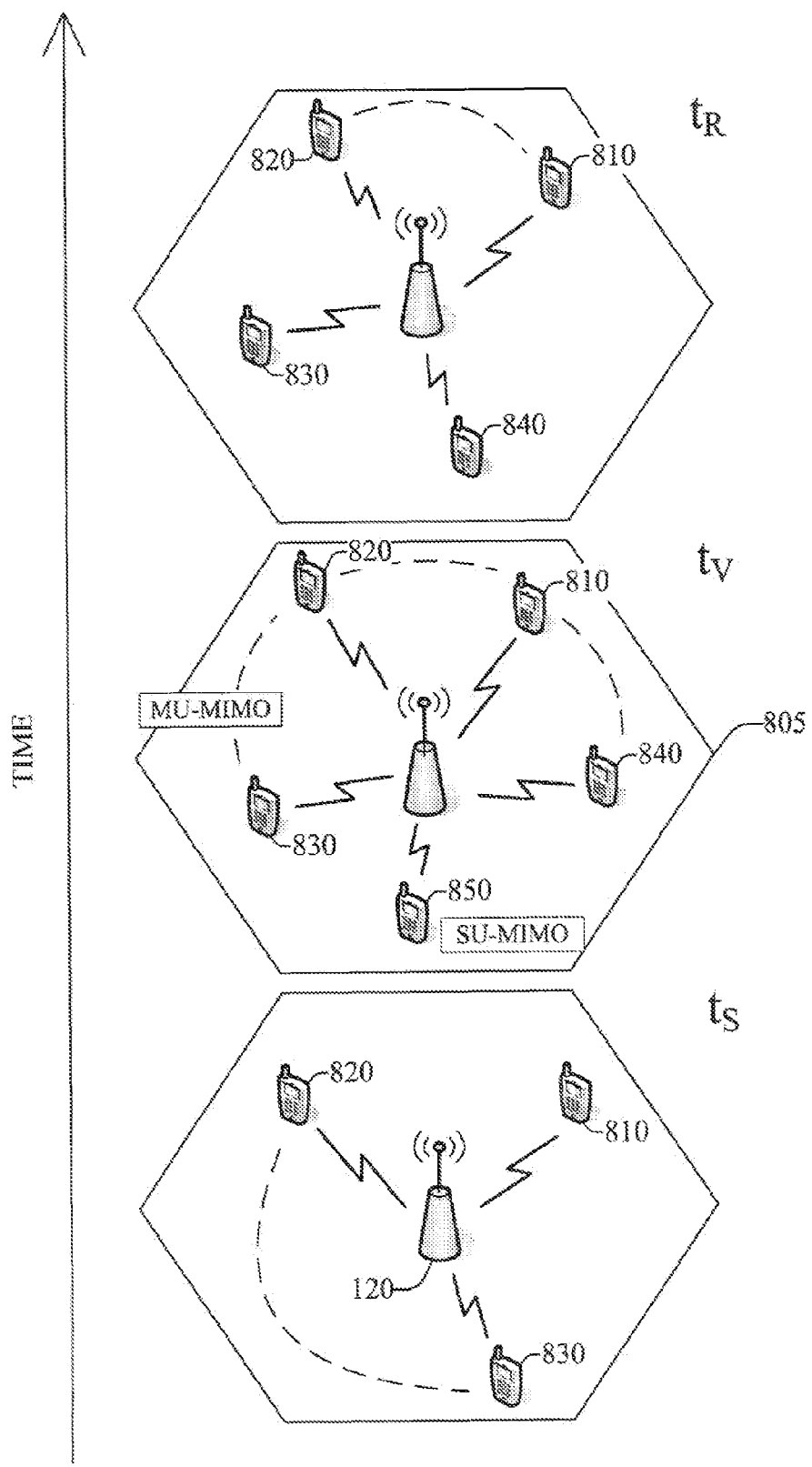
FIG. 8 illustrates dynamic scheduling of SU-MIMO and MU-MIMO users as population in a service cell changes.

FIG. 8 illustrates dynamic scheduling of SU-MIMO and MU-MIMO users as the population of a service cell 810 changes. The exemplary service cell is hexagonal, but it should be appreciated that cell shape is dictated by the particular tiling that covers a specific area of service. Three snapshots of cell 805 are shown at times $t_S < t_V < t_R$. At time $t_S$, three users (810, 820, and 830) populate the cell, and the base station 120, based on reported $\langle CQI \rangle$, $\langle \Delta CQI \rangle$, and rank of virtual antenna set, has scheduled 810 in SU-MIMO and 820 and 830 in MU-MIMO (this mode represented by dashed lines connecting the scheduled terminals). SU-MIMO UE (810) and MU-MIMO UEs (820 and 830) can be utilizing mutually separate time-frequency resources. At time $t_V$, two users (850 and 840) enter the cell, base station 120 receives new $\langle CQI \rangle$, $\langle \Delta CQI \rangle$, in addition to requests for virtual antenna sets from each of the UEs that entered the cell. Base station schedules one user in SU-MIMO and four users in MU-MIMO (FIG. 8). Note that user 810, previously a SU-MIMO user, has been dynamically rescheduled in MU-MIMO mode. As discussed above, these MU-MIMO users may have been scheduled optimally, e.g. each terminal requested a singe virtual antenna, or sub-optimally but without delay. It should be appreciated that at time $t_V$ there are no users shown as delayed; however, possible delays may have taken place at earlier times for the reasons discussed above. Similarly, at time $t_R$, cell population changes again, a user exits the cell and remaining users are rescheduled. It should be appreciated that the dynamical changes in mode of operation are dictated by all the users simultaneously via newly reported values of channel condition and virtual antenna set selection. Furthermore, other changes (e.g. base station buffer status) in the service cell other than population can trigger dynamical rescheduling of operation mode. The specific scheduling approach based on the reporting method discussed herein is insensitive to the details of such changes.

Figure 9:
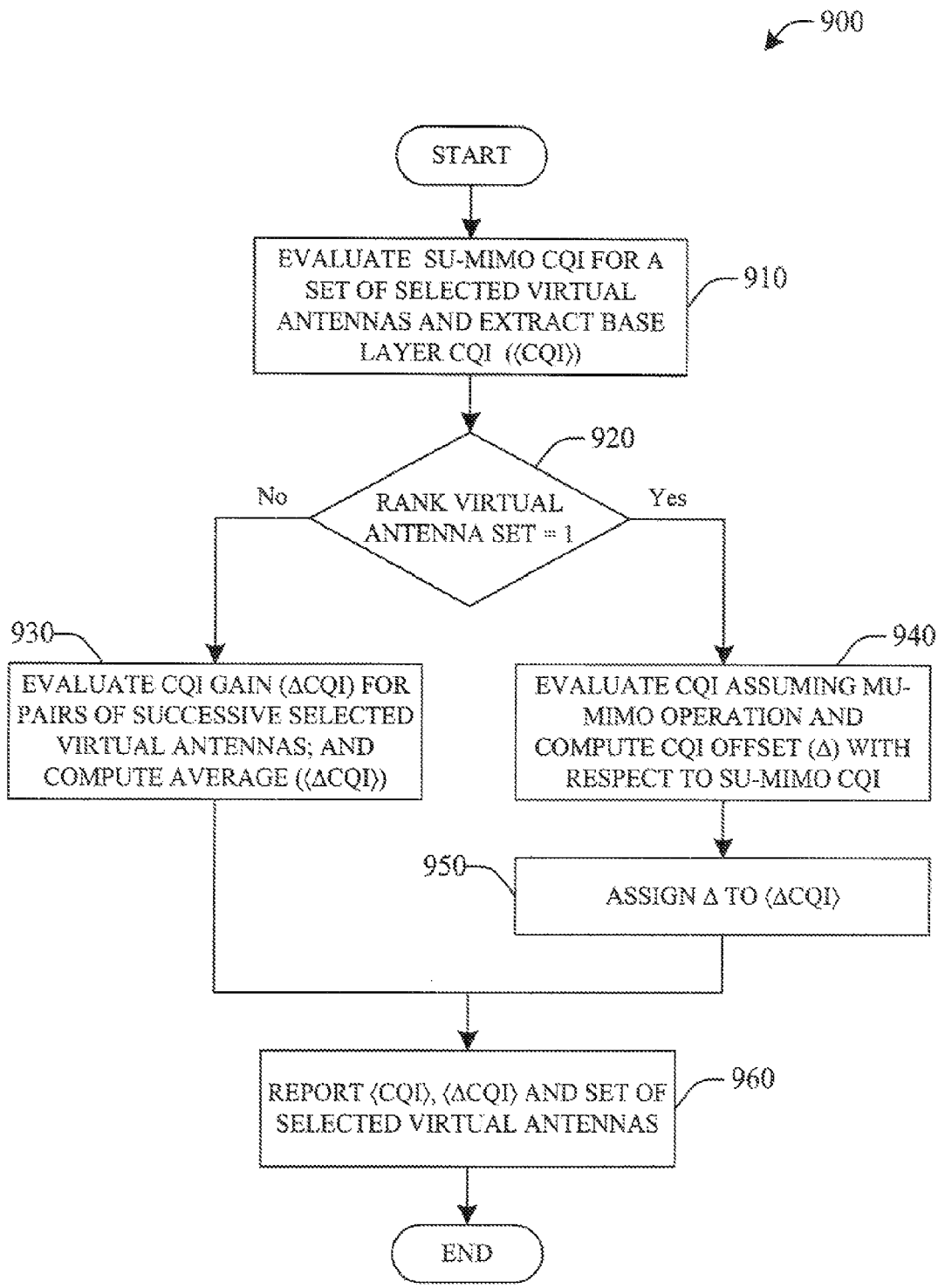
FIG. 9 is a flow chart of a method to convey channel conditions.
Figure 10:
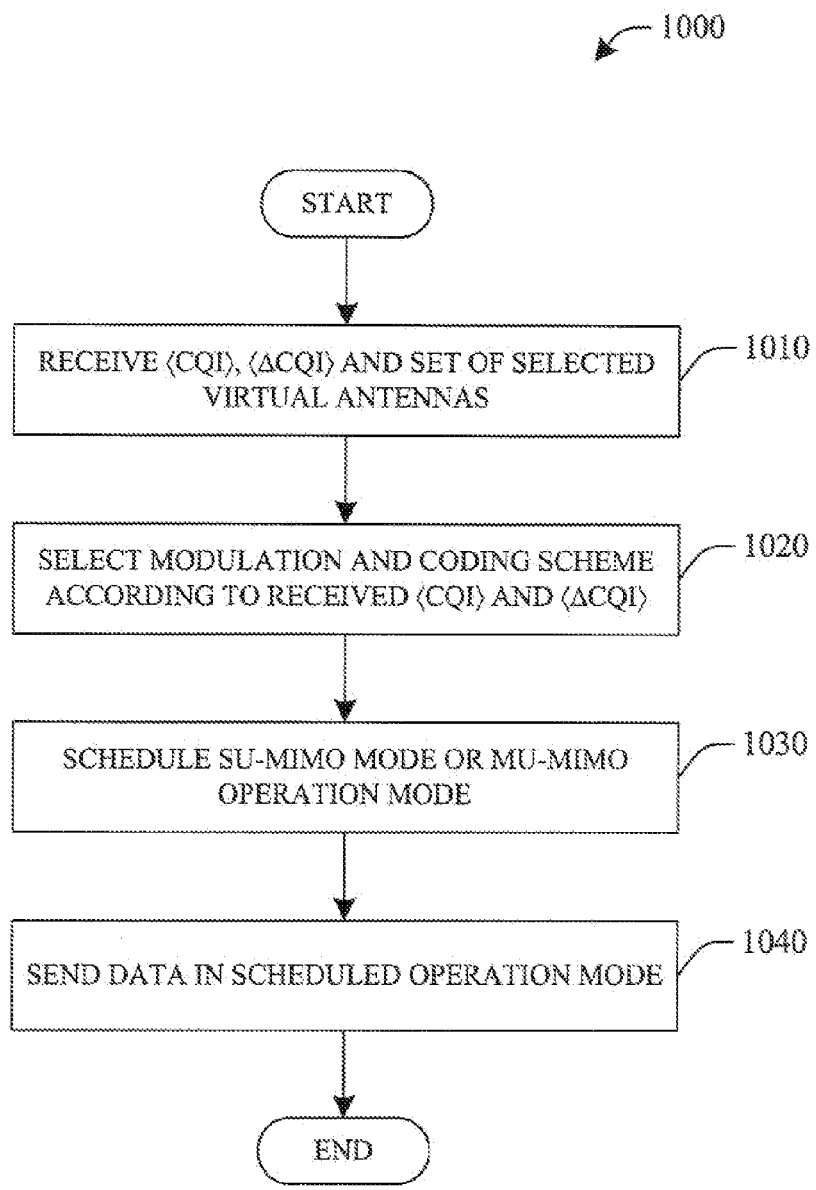
FIG. 10 is a flow chart of a method to schedule SU-MIMO and MU-MIMO operation.

In view of the exemplary systems shown and described above, methodologies that may be implemented in accordance with the disclosed subject matter, will be better appreciated with reference to the flow charts of FIGS. 9-10. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

FIG. 9 shows a flow chart of a method to report channel conditions to a transmitter (e.g. base station). At 910, channel quality information is evaluated for a set of selected virtual antennas. The CQI is evaluated assuming SU-MIMO operation mode. Virtual antennas can be selected by a terminal based on a plurality of performance metrics (e.g., signal-to-noise ratio, throughput, or capacity), comparing the performance of all possible virtual antenna subsets for a given number of physical antennas. Base layer CQI ($\langle CQI \rangle$) is extracted. In one aspect, $\langle CQI \rangle$ can correspond to the CQI value of the first detected layer. In another aspect, base layer CQI value can correspond to the average CQI over the set of selected virtual antennas if layer permutation is applied. Act 920 is a validation act, the rank of the selected set of virtual antennas is compared to unity (e.g., one virtual antenna). In case rank is greater than unity (e.g., "No" flow associated with act 920), at act 930 the CQI gain ($\Delta CQI$) that arises from successive interference cancellation is computed, so is the average of the gain ($\langle \Delta CQI \rangle$) over the selected virtual antennas. The computation of $\Delta CQI$ is performed pairwise for sequential layers (FIG. 6A). In case rank is 1, at 940 the channel quality information assuming MU-MIMO operation is evaluated, and the offset ($\Delta$) between SU-MIMO CQI and MU-MIMO CQI is computed (see discussion above in connection with FIG. 6B). In this case, $\Delta$ is assigned to $\langle \Delta CQI \rangle$ At 960, channel state information ($\langle CQI \rangle$, $\langle \Delta CQI \rangle$.) and the set of selected virtual antennas is reported to base station. In an embodiment, {$\langle CQI \rangle$, $\langle \Delta CQI \rangle$} can be reported on the uplink physical (PHY) layer CQI control channel, and the selected virtual antenna set can be reported through the UL PHY antenna subset indicator control channel.

FIG. 10 shows a flow chart of a method to schedule SU-MIMO/MU-MIMO operation mode in a service cell of wireless terminals. At 1010, channel quality information values $\langle CQI \rangle$ and $\langle \Delta CQI \rangle$, in addition to an indicator of a selected set of virtual antennas, is received (e.g., by a base station). According to the received channel state information, a modulation and coding scheme is selected at act 1020. At 1030, the mode of operation for telecommunication is set to SU-MIMO or MU-MIMO. Such selection is based on the received channel state information, and the set of selected virtual antennas. In an aspect, if the rank of the selected virtual antenna set is greater than one, terminals conveying the information can be preferably scheduled in SU-MIMO mode, whereas if the rank is unity the terminals can be scheduled for optimal operation in MU-MIMO mode. At 1040, data is sent (e.g., in the forward link of a wireless service cell) in the scheduled mode of operation.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within scope of the appended claims. To the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus that operates in a wireless communication environment, the apparatus comprising:
   a processor configured to evaluate a channel quality indicator (CQI) base layer value (⟨CQI⟩) assuming single-user multiple-input multiple-output operation mode and a CQI offset value (⟨ΔCQI⟩), to select a virtual or physical antenna set, to report the evaluated ⟨CQI⟩, ⟨ΔCQI⟩ and the selected virtual or physical antenna set, and to receive an assignment to operate in one of single-user multiple-input multiple-output mode or multiple-user multiple-input multiple-output mode based on the reported ⟨CQI⟩, ⟨ΔCQI⟩ and the selected virtual or physical antenna set; and
   a memory coupled to the processor for storing the evaluated data.

2. The apparatus of claim 1, the processor further configured to detect data employing successive interference cancellation.

3. The apparatus of claim 1, wherein the channel quality indicator corresponds to at least one of signal-to-noise-and-interference ratio, throughput, and peak data rate.

4. The apparatus of claim 1, wherein the processor evaluates the channel quality indicator base layer value as the average of channel quality indicator full values over a set of multiple virtual antennas.

5. The apparatus of claim 1, wherein the processor evaluates the channel quality indicator base layer value by assuming that data layers are symmetrically permuted in frequency-domain or time-domain before being transmitted over a set of multiple virtual antennas, the permutation further assumed to be at least simple cyclic or pseudo-random.

6. The apparatus of claim 1, wherein the processor computes successive interference cancellation gains between successively decoded data layers when multiple virtual antennas are selected.

7. The apparatus of claim 1, wherein the processor evaluates the channel quality indicator offset value by computing the average of successive interference cancellation gains over multiple virtual antennas.

8. The apparatus of claim 1, wherein the processor evaluates the channel quality indicator offset value by computing the difference between single-user multiple-input multiple-output mode and multi-user multiple-input multiple-output mode when a single virtual antenna is selected.

9. The apparatus of claim 1, wherein the processor quantizes the full value of ⟨CQI⟩ to a selected number of bits and quantizes the full value of ⟨ΔCQI⟩ to a smaller selected number of bits to reduce reporting feedback overhead.

10. The apparatus of claim 1, wherein the processor selects a virtual antenna set by computing a channel quality indicator over a plurality of virtual antenna configurations.

11. A method used in a wireless communication system, the method comprising:
   evaluating a channel quality indicator (CQI) base layer value (⟨CQI⟩) assuming single-user multiple-input multiple-output operation mode and a CQI offset value (⟨ΔCQI⟩) for a selected set of virtual or physical antennas;
   reporting the evaluated ⟨CQI⟩, ⟨ΔCQI⟩ and the selected virtual or physical antenna set; and
   receiving an assignment to operate in one of single-user multiple-input multiple-output mode or multiple-user multiple-input multiple-output mode based on the reported ⟨CQI⟩, ⟨ΔCQI⟩ and the selected virtual or physical antenna set.

12. The method of claim 11, wherein evaluating the channel quality indicator offset value comprises computing successive interference cancellation gains between successively transmitted data layers when multiple virtual antennas are selected.

13. The method of claim 11, wherein evaluating the channel quality indicator (CQI) offset value comprises computing the difference between CQI in single-user multiple-input multiple-output mode and CQI in multi-user multiple-input multiple-output mode when a single virtual antenna is selected.

14. An electronic device configured to execute the method of claim 11.

15. An apparatus that operates in a wireless communication environment, the apparatus comprising:
   means for evaluating a channel quality indicator (CQI) base layer value (⟨CQI⟩) assuming single-user multiple-input multiple-output operation mode and a CQI offset value (⟨ΔCQI⟩), and selecting a set of virtual or physical antennas;
   means for quantizing the full value of ⟨CQI⟩ to a selected number of bits and quantizing the full value of ⟨ΔCQI⟩ to a smaller selected number of bits;
   means for reporting the evaluated ⟨CQI⟩, ⟨ΔCQI⟩ and the selected virtual or physical antenna set; and
   means for receiving an assignment to operate in one of single-user multiple-input multiple-output mode or multiple-user multiple-input multiple-output mode based on the reported ⟨CQI⟩, ⟨ΔCQI⟩ and the selected virtual or physical antenna set.

16. The apparatus of claim 15, further comprising means for quantizing to a selected number of bits the full values of the channel quality indicator (CQI) base layer value, and the CQI offset value.

17. A non-transitory machine-readable medium comprising instructions which, when executed by a machine, cause the machine to perform operations including:
   evaluating a channel quality indicator (CQI) base layer value (⟨CQI⟩) assuming single-user multiple-input multiple-output operation mode and a CQI offset value (⟨ΔCQI⟩);
   selecting a virtual or physical antenna set;
   reporting ⟨CQI⟩, ⟨ΔCQI⟩, and the set of virtual or physical antennas; and
   receiving an assignment to operate in one of single-user multiple-input multiple-output mode or multiple-user multiple-input multiple-output mode based on the reported ⟨CQI⟩, ⟨ΔCQI⟩ and the selected virtual or physical antenna set.

18. An apparatus operable in a wireless communication system, the apparatus comprising:
   a processor configured to receive a channel quality indicator (CQI) base layer value (⟨CQI⟩) calculated assuming single-user multiple-input multiple-output operation mode, a CQI offset value (⟨ΔCQI⟩), and a virtual or physical antenna set selection;
   a memory coupled to the processor for storing the received data; and
   a scheduler component that dynamically determines whether a user device operates in single-user multiple-input multiple-output mode or multi-user multiple-input multiple-output mode based on the received data.

19. The apparatus of claim 18, further comprising a transmitter that applies a symmetric permutation to multiple data layers in frequency-domain or time-domain prior to sending the data layers over a selected virtual antenna set in the single-user multiple-input multiple-output mode; the permutation being at least simple cyclic or pseudo-random.

20. The apparatus of claim 18, further comprising a transmitter that applies a symmetric permutation to multiple data layers in frequency-domain or time-domain prior to sending the data layers over a selected virtual antenna set assigned to each user in a plurality of users in the multi-user multiple-input multiple-output mode, but avoids a symmetric permutation across data layers belonging to disparate users in the plurality of users in the MIMO mode, the permutation being at least simple cyclic or pseudo-random.

21. The apparatus of claim 18, wherein the scheduler component includes a processor that executes a scheduling algorithm or an optimization algorithm stored in an algorithm store.

22. A method used in a wireless communication system, the method comprising:
receiving a channel quality indicator (CQI) base layer value (⟨CQI⟩) calculated assuming single-user multiple-input multiple-output operation mode, a CQI offset value (⟨ΔCQI⟩), and a virtual or physical antenna set selection;
selecting a modulation and coding scheme according to the received base layer value and offset value; and
scheduling a terminal in one of single-user multiple-input multiple-output operation mode or multi-user multiple-input multiple-output operation mode based on the received ⟨CQI⟩, ⟨ΔCQI⟩, and virtual or physical antenna set selection.

23. The method of claim 22, further comprising sending data to the terminal in the scheduled mode of operation.

24. The method of claim 22, further comprising applying a symmetric permutation to multiple data layers in frequency-domain or time-domain prior to sending the data layers over a selected virtual antenna set in the single-user multiple-input multiple-output mode; the permutation being at least simple cyclic or pseudo-random.

25. The method of claim 22, further comprising applying a symmetric permutation to multiple data layers in frequency-domain or time-domain prior to sending the data layers over a selected virtual antenna set assigned to each user in a plurality of users in the multi-user multiple-input multiple-output (MIMO) mode, and avoiding the symmetric permutation across data layers that belong to disparate users in the plurality of users in the MIMO mode; the permutation being at least simple cyclic or pseudo-random.

26. The method of claim 22, further comprising changing the scheduled mode of operation based at least on population of a service cell.

27. An apparatus used in a wireless communication system, comprising:
means for receiving a channel quality indicator (CQI) base layer value (⟨CQI⟩) calculated assuming single-user multiple-input multiple-output operation mode, a CQI offset value (⟨ΔCQI⟩), and a virtual or physical antenna set selection; and
means for scheduling a terminal in one of single-user multiple-input multiple-output operation mode or multi-user multiple-input multiple-output operation mode based on the received ⟨CQI⟩, ⟨ΔCQI⟩, and virtual or physical antenna set selection.

28. The apparatus of claim 27, further comprising means for sending data in the scheduled mode of operation.

29. The apparatus of claim 27, further comprising means for applying a symmetric permutation to multiple data layers in frequency-domain or time-domain prior to sending the data layers over a selected virtual antenna set in the single-user multiple-input multiple-output mode; the permutation being at least simple cyclic or pseudo-random.

30. The apparatus of claim 27, further comprising means for applying a symmetric permutation to multiple data layers in frequency-domain or time-domain prior to sending the data layers over a selected virtual antenna set assigned to each user in a plurality of users in the multi-user multiple-input multiple-output (MIMO) mode, and means for avoiding the symmetric permutation across data layers that belong to disparate users in the plurality of users in the MIMO mode; the permutation being at least simple cyclic or pseudo-random.

31. A non-transitory machine-readable medium comprising instructions which, when executed by a machine, cause the machine to perform operations including:
scheduling a wireless device in one of single-user multiple-input multiple-output operation mode or multi-user multiple-input multiple-output operation mode based on a received channel quality indicator (CQI) base layer value (⟨CQI⟩) calculated assuming single-user multiple-input multiple-output operation mode, a CQI offset value (⟨ΔCQI⟩), and virtual or physical antenna set selection; and
optimizing the scheduled resources.

* * * * *